3,541,061
VINYL CHLORIDE-PROPYLENE-ETHYLENE TERPOLYMER
Charles A. Heiberger, Princeton, N.J., assignor to Air Reduction Company, Incorporated, New York, N.Y., a corporation of New York
Filed Dec. 30, 1966, Ser. No. 606,244
Int. Cl. C08f 15/40, 45/54, 45/22
U.S. Cl. 260—80.78         17 Claims

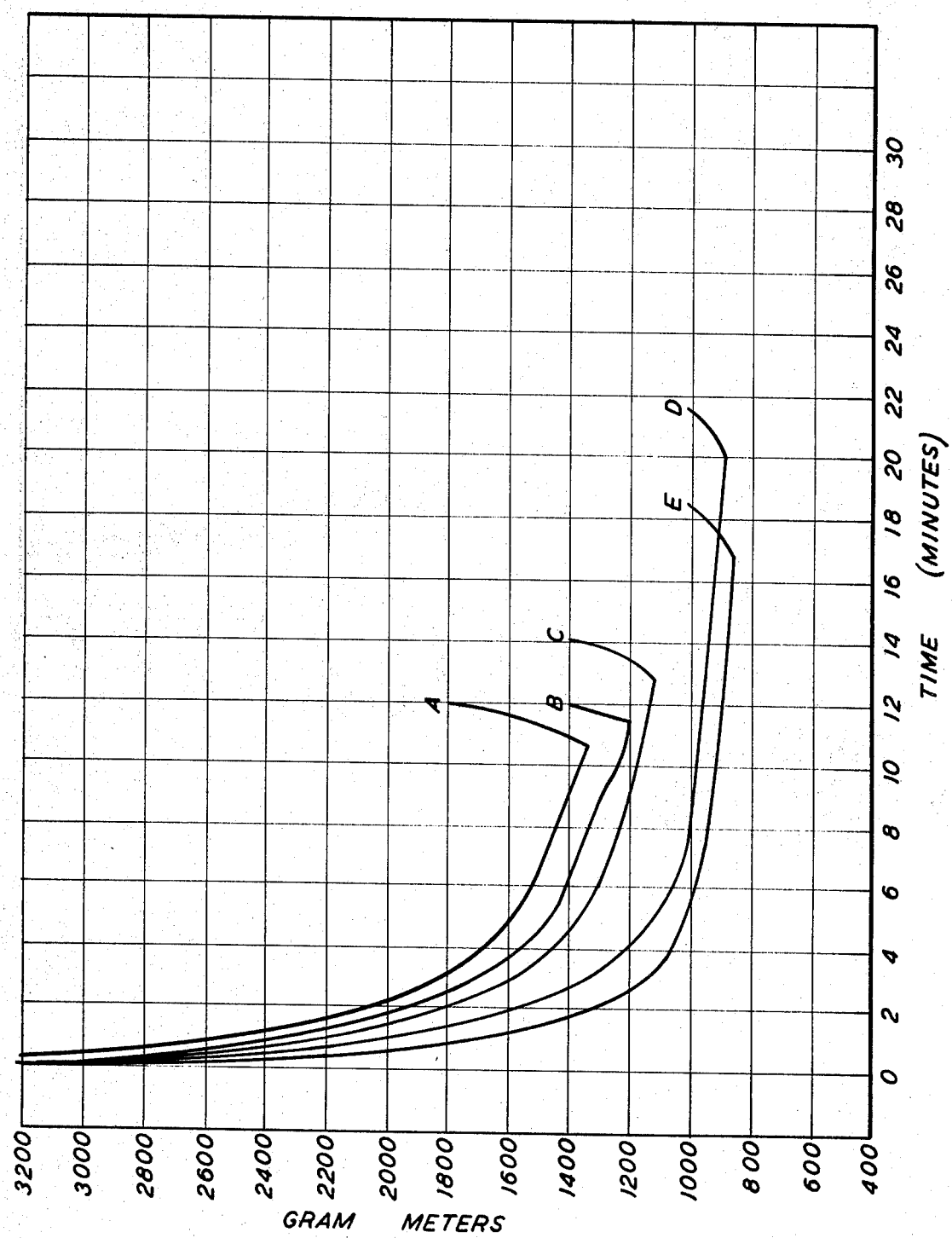

ABSTRACT OF THE DISCLOSURE

A terpolymer of vinyl chloride, propylene, and ethylene is provided. The terpolymer may be combined with a stabilizer and a lubricant to form a rigid resinous composition which is formable by thermo-molding operations into a shaped article. The terpolymer is suitably prepared by subjecting vinyl chloride, ethylene and propylene to interpolymerization in an aqueous suspension system.

---

The present invention is concerned with rigid resinous compositions for hot molding, extrusion, thermoforming, and other hot shaping operations which compositions have improved physical properties and processing characteristics, and the invention is more particularly concerned with molding, extrusion and other formable compositions of the character indicated formed from polymers comprising vinyl chloride, ethylene and propylene, i.e., polymers produced by the polymerization of vinyl chloride in the presence of ethylene and propylene, hereinafter referred to for convenience as vinyl chloride terpolymers. The invention is also concerned with processes for the preparation of these vinyl chloride terpolymers, and with rigid shaped articles produced by the shaping of the resinous compositions under the influence of heat.

Rigid resinous compositions are defined by ASTM D883 as plastics which have a stiffness or apparent modulus of elasticity greater than 100,000 p.s.i. at 23° C., when determined in accordance with The Method of Test for Stiffness in Flexure of Plastics (ASTM D747). Vinyl chloride homopolymers are, in general, rigid materials characterized by substantial resistance to chemical attack, and they are used extensively in the chemical processing industry as well as in other manufacturing applications. Thus, unplasticized rigid polyvinyl chloride resins have a combination of properties generally not obtainable with other known low cost commercial plastics, viz:

(1) Excellent resistance to water, acids, alkalies, salts, organic chemicals, and to external aging environments.

(2) Low vapor permeability to water, oxygen and many volatile organic compounds.

(3) High clarity and gloss.

(4) High modulus and physical strength.

(5) Nonflammability.

(6) Good electrical properties.

However, resinous compositions comprising rigid vinyl chloride homopolymers are difficult to mold, to extrude or to flux and mill satisfactorily on conventional equipment, i.e., they have poor flow characteristics and stability under dynamic processing conditions. This poor dynamic processability is due in part to the high melting point of the homopolymers and to the high viscosity evidenced by the polymers at temperatures above the softening point of the polymers and in the range encountered with conventional manufacturing operations of the type mentioned. Furthermore, such homopolymers tend to decompose or to degrade thermally before reaching a viscosity sufficiently low to assure the flow characteristics necessary for many manufacturing operations.

Thus, commercial applications of polyvinyl chloride rigid resin compositions have been limited and/or excluded in certain cases by practical difficulties in processing, e.g., in the extrusion and molding of end products having desired characteristics. The proximity of the glass transition temperature (below which flow is negligible) and the temperature at which the resin is unstable (discolors and degrades) not only requires close and careful control of processing conditions, but some processes, particularly injection molding, have not been possible under practical conditions, from both economic and technical considerations.

Attempts to improve the processing characteristics of polyvinyl chloride have involved the incorporation of so-called "external" plasticizers, such as dioctyl phthalate, or the formation of so-called "polyblends" with butadiene-acryonitrile or acrylate polymers, or similar compounding ingredients, or the polyvinyl chloride has been prepared by polymerization processes which lead to a polymer of low molecular weight. These procedures, however, have ordinarily proven unsatisfactory because any improvement achieved has frequently been accomplished by an undue sacrifice of other desirable physical properties of the polymers, such as rigidity, impact toughness, heat-deflection temperature, chemical resistance and the like, or the products are economically unattractive for most applications.

For example, in the case of low molecular weight polyvinyl chloride resins, physical strength and impact toughness are severely decreased, and the resultant lower heat stability is a problem. When use is made of external plasticizers, the presence of even small concentrations of plasticizers results in lower strength and reduced toughness. Polyblends with butadiene-acrylonitrile rubbers or acrylic polymers or like materials do not give clear rigid plastics, are expensive, and degrade other properties such as weather resistance, chemical resistance, and nonflammability. In short, when attempts are made to modify the processing characteristics of polyvinyl chloride compositions, the resultant shaped products lack the desired properties.

It has also been proposed to copolymerize vinyl chloride with various comonomers, such as vinyl acetate, dioctyl fumarate, octyl acrylate and the like, but compositions having the desired dynamic processability and at the same time having the desired characteristics for making rigid products have not heretofore been successfully produced by this technique. While copolymers with vinyl acetate or dialkyl fumarates are both available commercially, these copolymers are less heat stable, less dimensionally stable, and less chemically resistant than polyvinyl chloride resins and, in addition, they comprise a more expensive resin composition.

It is accordingly, an object of this invention to provide rigid resinous compositions comprising vinyl chloride polymers which avoid the disadvantages and drawbacks of vinyl chloride polymer compositions heretofore known.

In Heiberger et al. copending application Ser. No. 459,289, filed May 27, 1965, now U.S. Pat. 3,468,840, dated Sept. 23, 1969, there is disclosed a class of vinyl chloride-ethylene copolymers which have advantageous properties, and are effective in compositions for making rigid products. Heiberger et al. copending application Ser. No. 422,619, filed Dec. 31, 1964, now U.S. Pat. 3,468,858, dated Sept. 23, 1969, discloses a class of vinyl chloride-propylene copolymers which also have advantageous properties and which also are effective in compositions suitable for the fabrication of rigid products.

In accordance with the present invention, it has now been found that vinyl chloride polymers having improved physical properties and processing characteristics, including high dynamic heat stability, and effective to form resinous compositions for the production of rigid products, can be obtained by the polymerization of vinyl chloride with small amounts of both ethylene and propylene. Such vinyl chloride terpolymers can be used in any of the applications in which conventional vinyl chloride homopolymers have heretofore been employed, as well as those previously believed precluded for such polymers, e.g., certain extrusion and injection molding operations, as well as blow-molding operations.

Thus, the present invention effectively solves the foregoing problems by providing rigid resinous compositions which have the desirable dynamic processability, including dynamic heat stability, which makes them suitable for the formation of shaped products under the influence of heat without thermal decomposition, yet they are effective to produce shaped products which are truly rigid and may have an elevated heat-deflection temperature above 150° F.

We have, in effect, discovered a novel family of vinyl chloride terpolymer resins which permit the preparation of rigid resinous compositions which have outstanding dynamic processability, including markedly improved heat stability, yet retain the impact toughness, dimensional stability and other desirable properties of unmodified polyvinyl chloride rigid resinous compositions. These vinyl chloride terpolymer resins contain up to 10% by weight of combined ethylene and propylene, but at least 2% by weight, preferably, 3 to 8%, and they have an average molecular weight, expressed in terms of intrinsic viscosity, of 0.5 to about 1.5 dl./g., preferably, 0.6 to 1.1 dl./g., with a melt flow rate of at least 0.1 dg./min. and an apparent modulus of elasticity of at least 100,000 p.s.i. at a temperature within the range from about 40° C. to about 80° C. As a general rule, the melt flow rate will be at most about 500 dg./min., preferably at most about 250 dg./min., and the above-mentioned terpolymers having a combined ethylene and propylene content of 3 to 8% and an intrinsic viscosity of 0.6 to 1.1 dl./g., most suitably have a melt flow rate of about 1 to 150 dg./min.

The ratio between ethylene and propylene in the terpolymers can vary from 5:1 to 1:20 with the ratios between these two olefins preferably being 2:1 to 1:10, especially about 1:1 to about 1:5.

Intrinsic viscosity values in dl./g., as used herein, are determined in conventional manner by extrapolation to infinite dilution of the reduced viscosity values at several concentrations of the polymer in cyclohexanone, as determined, for example, according to ASTM, D243–60, Method A but at 25° C. Weight percent propylene and ethylene in the terpolymers is determined from chlorine analysis and correlated with volume percent ethylene and propylene as determined by measurements of specific gravity (ASTM D792–60T) on a standard molded composition containing 3 parts by weight of an organic tin mercaptide stabilizer (Advastab T-360) per 100 parts by weight of terpolymer. Ethylene and propylene contents are individually estimated from $T_f$ values and the above total olefin content determined. Melt flow rate is determined by means of ASTM D1238–57T, condition F, for the terpolymer in the above standard molded composition. The apparent modulus of elasticity is determined by means of ASTM D1043–61T and the results are expressed as $T_f$, in ° C., which is the temperature corresponding to 135,000 p.s.i. apparent modulus of elasticity. As is known, the $T_f$ value which is expressed in terms of apparent modulus of elasticity, as mentioned, corresponds approximately to the heat-deflection temperature.

Heat stability can be determined in several ways. In a first method, a sample of the resin, in the form of a milled sheet composition containing 3 parts by weight of an organic tin mercaptide stabilizer (Advastab T–360), is maintained in an air oven at 400° F. and the time, in minutes, after which the resin sample turns black is noted. The change to black occurs relatively suddenly and there is no appreciable transition in color.

In the oven stability test described above vinyl chloride-vinyl acetate copolymer resins have been found to run less than 15 minutes at 400° F. before first evidence of black discoloration, whereas the vinyl chloride terpolymer compositions contemplated by this invention run typically from 35 to 50 minutes.

The vinyl chloride terpolymers with which this invention is concerned can also be characterized in terms of their dynamic behavior when tested in a standard Brabender plastograph. This well-known instrument is described, for example, in "Kunststoffe," vol. 54, pp. 169–177 (March 1964), and is, in effect, a miniature Banbury mixer. In making the determination of the dynamic properties of the vinyl chloride terpolymers, the Brabender plastometer is operated at a fixed bowl temperature of 375° F. and at 63 and 95 revolutions per minute of the differential speed mixing arms. The standard test specimen subjected to test in the Brabender plastometer is a composition consisting of the resin compounded with 3 parts per hundred of the standard stabilizer Mark 292 (alkyl tin thio glycolate) and 0.5 part per hundred of mineral oil as a standard lubricant.

Results are plotted as the torque in gram-meters against time in minutes. The test is continued until the plotted line definitely turns upwardly and continues upwardly, which indicates decomposition. Thus, the time required before decomposition is a measure of heat stability under dynamic conditions, i.e., dynamic heat stability. When the time in seconds to decomposition is divided by the torque in kilo gram-meters at decomposition, and this product is multiplied by the square of the intrinsic viscosity, there is obtained a numerical value which can be referred to as the "Dynamic Processability Index."

A series of vinyl chloride terpolymers representative of those relating to this invention were evaluated in a Brabender plastograph in accordance with the previously-specified conditions for testing with this instrument. The properties of the resins in the test specimens were as follows:

| Code | Resin | Intrinsic visc., dl./g. | Comonomer | Wt. percent | Wt. percent ethylene |
|---|---|---|---|---|---|
| A | VC–E–P terpolymer | 0.87 | Propylene | 3.3 | 0.9 |
| B | do | 0.87 | do | 2.8 | 3.0 |
| C | do | 0.82 | do | 3.0 | 2.2 |
| D | do | 0.76 | do | 4.9 | 0.6 |
| E | do | 0.72 | do | 4.7 | 2.1 |

The results are shown in the drawing wherein torque in gram-meters (proportional to melt viscosity) is plotted as a function of time (proportional to dynamic stability). By referring to the drawing and to the intrinsic viscosity values in the foregoing table, it will be seen that compositions A, B, C, D, and E have, respectively, Dynamic Processability Indices of 355, 430, 460, 640, and 600.

The "Dynamic Processability Index" of the terpolymers with which this invention is concerned is at least 300 and preferably at least 400.

The above-characterized vinyl chloride terpolymers in the form of formable compositions have high melt flow characteristics which are usually 10 to 100-fold or more of those of polyvinyl chloride resins of the same molecular weight. Chemical resistance, impact toughness, clarity, nonflammability, electrical properties, and the like are comparable or superior to polyvinyl chloride resins, but their dynamic heat stability is significantly greater than that of polyvinyl chloride resins of the same molecular weight. In particular, the formable resinous compositions of this invention which comprise the above-characterized vinyl chloride terpolymers can be effectively employed for making rigid structure for use in industrial and consumer containers, piping, electrical conduits, structural panels, packaging film, and other molded and extruded products. It will be understood that the formable compositions or compounds formed from these vinyl chloride terpolymers, e.g., molding compounds or extrusion compounds, are used in conventional particular form, e.g., as pellets, powders, granules, and the like.

A particularly important feature of the novel terpolymer compositions of this invention is the surprising and unexpected combination of desirable melt flow characteristics and unusual heat stability. In other words, these terpolymers have exceptionally good dynamic processability, as above described, which permits their use in rigid resinous compositions for molding, extrusion, and other operations for which conventional vinyl chloride polymers are unsuited. Because of their unusual heat stability, these vinyl chloride terpolymer compositions can be processed at higher temperatures with resulting low melt viscosity as compared to conventional vinyl chloride homopolymers and other conventional copolymers. Although many vinyl chloride copolymers, such as copolymers with vinyl acetate, dioctyl fumarate, octyl acrylate, etc., show high melt flow characteristics, all of these conventional copolymers are less stable to heat than the vinyl chloride terpolymers. The vinyl chloride terpolymer compositions are readily handled by conventional molding, extruding, coating and like machinery, by reason of their properties at the temperatures employed in such apparatus. The unusual dynamic heat stability of the vinyl chloride terpolymers makes it possible for them to be used in formable compositions for producing containers, packages, and other items which are adapted to come into contact with foods. One problem encountered in the vinyl chloride polymer art relating to rigid resinous compositions is that it has generally been necessary to use stabilizers which are not acceptable in products intended for contact with food. This has been due to the fact that when polymers have relatively poor heat stability, the stabilizers used with them in formable compositions must be highly effective and, generally speaking, the most highly effective stabilizers are not approved for use with foods. The less effective stabilizers which are approved for use with food, on the other hand, are generally not sufficiently potent to be effective with resins of ordinary heat stability. The unusual dynamic heat stability of the vinyl chloride terpolymers defined above, however, makes it possible for less effective stabilizers to be used in molding, extruding or coating compositions containing these copolymers, so that there can be satisfactorily produced numerous products which can be employed in the food packaging art.

When the above-described vinyl chloride terpolymer resins are employed in rigid resinous compositions, they suitably have added to them stabilizers and lubricants, and they may also be compounded with fillers, pigments, and resin additives to modify properties as desired. Conventional compounding agents of a type well known in the polymer art, and particularly in connection with vinyl resins, are suitably used. For example, suitable stabilizers include the well-known alkyl tin thioglycollate (Thermolite 31), di-octyl tin dilaurate, basic lead carbonate, metal phenates such as zinc, lead or tin phenate, and barium n-nonyl phenate, fatty acid soaps of lead, cadmium, barium, calcium, magnesium and zinc, cadmium benzoate, triphenyl phosphite, mono-octyl diphenyl phosphite, di-(epoxyethyl)benzene, epoxidized fatty oils, manganous pyrophosphite, and the like, alone or in combination. The function of various stabilizers in such polymers is well known and is described, for example, in "Polymer Processes" by Schildknecht, pages 542–548. In general, any of the many stabilizers suitable for use with polyvinyl chloride may be employed. When the compositions are to be used for food packaging, or the like, the stabilizer and the other additives must be those which are approved for such use, i.e., they must be nontoxic. Approved additives are well-known and typical approved stabilizers, for example, are nontoxic stabilizers which include fatty acid soaps of metals of Group II of the Periodic Table having an atomic weight of less than 100, such as the calcium, magnesium and zinc soaps of stearic, lauric and ricinoleic acids, as well as the alkali metal soaps of fatty acids, and various wholly organic stabilizers.

In like manner, conventional lubricants, such as mineral oil, fatty acids, synthetic waxes of the fatty amide and ester types, octyl stearate and calcium stearate, are used. Polymer lubricants are referred to in Schildknecht, pp. 685 et seq. The stabilizers or inhibitors and lubricants are used in varying quantities, such as described in the foregoing publication, depending upon the nature of the individual agent. For example, stabilizers are generally used in the amount of 0.5 to 5% by weight of the copolymer but the overriding criterion is the use of a small amount sufficient to effect the desired stabilization. The same considerations apply in the use of lubricants. In general, lubricants are used in amounts ranging from 0.1 to 1% or more by weight of the terpolymer. In accordance with this invention, the vinyl chloride terpolymers are combined with 0.1 to 10% by weight of combined lubricants and stabilizer.

Any and all pigments commonly employed in coloring polyvinyl chloride compositions may be used, such as carbon black, titanium dioxide, phthalocyanines, and the like, depending upon the color, if any, desired in the final product.

Either fibrous or nonfibrous fillers may be employed in preparing resinous compositions comprising the vinyl chloride terpolymers. The fibrous fillers that may be used include asbestos, glass fibers, cotton, rayon, nylon and the mineral wools. Asbestos is the most commonly used fibrous filler. The useful nonfibrous inorganic fillers include the many materials that are commonly employed as fillers in the plastics industry. These include, for example, calcium carbonate, calcium sulfate, calcium silicate, barium carbonate, barium sulfate, silica, china clay, kaolin, fuller's earth, and magnesium silicate, as well as such pigments as titanium dioxide, lead chromate, and iron oxide. The fibrous fillers can suitably be used in amounts up to approximately 200 parts and the nonfibrous fillers in amounts up to approximately 300 parts by weight per 100 parts by weight of vinyl chloride terpolymer resin.

While plasticizers are not ordinarily used in making rigid products, they can be used if desired. Any of the usual plasticizers for vinyl chloride resins may be used in the compositions of the present invention. These include, for example, dioctyl phthalate, dibutyl sebacate, tricresyl phosphate, and the like. The amount of plasticizers which can be used can vary depending on the rigidity and hardness desired.

In addition to the ingredients described, other resin additives, such as extenders, solvents, binders, and the like, may be present in the amounts ordinarily employed in the polyvinyl chloride art.

It is sometimes desirable to compound the vinyl chloride terpolymer resin compositions with other resinous materials which have a modifying effect upon the terpolymer resin. Examples of resinous materials suitable for this purpose include polyvinyl chloride, vinyl chloride-vinyl acetate copolymer and other vinyl chloride copolymers, chlorinated polyolefins, chlorinated polyvinyl chloride and chlorinated vinyl chloride copolymers, acrylonitrile-butadiene-styrene polymers, acrylonitrile-butadiene copolymers, alkyl acrylate-methacrylate copolymers, such as polymers containing ethyl acrylate and methyl methacrylate, ethylene-alkyl acrylate copolymers, ethylene-vinyl acetate copolymers, and chlorinated paraffin waxes. Such modifying resinous materials can be used in various amounts but ordinarily in relatively minor proportions, e.g., less than 50% by weight of the vinyl chloride-terpolymer resin, preferably 10 to 25%.

It will be understood that the rigid resinous compositions of this invention, e.g., molding compounds or extrusion compounds, comprising the vinyl chloride terpolymers having the specified characteristics are suitably employed in practice in conventional particulate form, e.g., as pellets, powders, granules, and the like. It will also be understood that in forming the rigid resinous compositions of the invention, the components which are combined with the vinyl chloride terpolymers may serve more than one function. For example, it is well known that some stabilizers have appreciable lubricating properties, or that some so-called lubricants are also effective stabilizers. Calcium stereate is a typical example of an additive suitably used in forming our rigid resinous compositions, which functions both as a lubricant and a stabilizer, although it is a relatively weak stabilizer. However, as previously discussed, the vinyl chloride terpolymers above characterized produce compositions having desirable dynamic processability, including dynamic heat stability, even when the stabilizer employed is relatively weak in its activity. Accordingly, while the compositions are defined as comprising the vinyl chloride terpolymer resin, a stabilizer, and a lubricant, it will be understood that a single additive can meet the stabilizer and lubricant requirements, and that two different additives are not always required. The same is true of other additives; thus a modifying resinous material may also serve as a plasticizer, and a filler may also serve as a pigment, and the like.

In all cases, the vinyl chloride terpolymer has the characteristics set forth above, combining ethylene and propylene content, average molecular weight (intrinsic viscosity), melt flow rate, apparent modulus of elasticity, and is characterized by having the above-mentioned Dynamic Processability Index.

The nature and advantageous features of rigid formable resinous compositions comprising the indicated family of vinyl chloride terpolymers of this invention will become more readily apparent as the description of the invention proceeds.

Another important feature of the vinyl chloride terpolymers is that they can be effectively produced, even with a relatively high ethylene and propylene content, by a process which does not require the use of high pressures or elevated temperatures, and thus can be carried out with no difficulty in relatively inexpensive, conventional polymerization equipment. We have discovered that the terpolymers can be produced at pressures that generally need to be no higher than about 300 pounds per square inch, usually in the range of 100 to 250 pounds per square inch, and that temperatures of 30 to 75° C. are suitably used, and the most preferable temperatures lie in the range of 45 to 60° C.

In this polymerization system, ethylene and propylene, besides having unfavorable reactivity ratios with vinyl chloride, appear to function as chain transfer agents. Accordingly, another important feature of this invention is the recognition of this fact and the discovery of process means to produce the vinyl chloride terpolymers having the combination of desirable physical properties and the unusual dynamic processing characteristics discussed above.

The molecular weight of the vinyl chloride terpolymers, as measured by intrinsic viscosity, is strongly influenced by the amount of ethylene and propylene charged to the batch. It has been found that in order to prepare vinyl chloride terpolymers of high intrinsic viscosity, it is necessary to prepare the terpolymers at temperature substantially less than is conventional for equivalent molecular weight vinyl chloride homopolymers.

The reactivity of catalysts varies, as it well known, and to insure reasonable reaction times, the more active catalysts, such as tert-butyl peroxy pivalate, are used at lower temperatures, while the less active catalysts, such as lauroyl peroxide can be used at the higher temperatures.

Furthermore, it has been found that changes in procedure that alter the relative comonomer concentrations from those found in the simple batch copolymerization technique, similarly affect the molecular weight (as measured by intrinsic viscosity) of the resultant terpolymer. Delayed feeds of either comonomer, removal of some of either or both comonomers during the reaction cycle, alteration of reactor fillage, modification of water and monomer ratios, etc., all influence the resultant terpolymer molecular weight as well as other polymer properties. It has been found, in general, that any process modification which tends to increase the concentration of ethylene and propylene in the polymerizing liquid monomer phase, tends to decrease the resulting terpolymer molecular weight. Conversely, any process modification which tends to decrease the concentration of ethylene and propylene in the polymerizing liquid monomer phase, tends to increase the terpolymer molecular weight.

The most suitable process for preparing the vinyl chloirde terpolymers with which this invention is concerned is essentially of the suspension polymerization type and the monomers are polymerized in an aqueous system, under constant agitation, in the presence of appropriate suspending and surface active agents, with the pH being advantageously maintained at a value of 5 to 8.5. However, other processes known to the art, such as emulsion, solution, and mass polymerization, can be employed to prepare the polymers used in the resinous compositions of the present invention.

Various suspending agents such as those which have been disclosed for use in the suspension polymerization of vinyl chloride can be employed, and examples of suitable suspending agents include polyvinyl alcohol, methyl cellulose, e.g., the products known commercially as "Methocel," gelatin, magnesium carbonate, guar gum, silica, magnesium lauryl sulfate, and magnesium silicate. We have found, however, that particularly good results are obtained when the suspending agent is polyvinyl alcohol or methyl cellulose. When polyvinyl alcohol is used as the suspending agent, we prefer to use partially-hydrolyzed polyvinyl alcohol, e.g., polyvinyl alcohol having a percent hydrolysis of 80 to 90, rather than fully hydrolyzed polyvinyl alcohol and of the type which forms solutions of medium viscosity, e.g., 30 to 50 centipoises in a 4% aqueous solution at 20° C. Commercial forms of such polyvinyl alcohol are exemplified by the products known as "Elvanol 50–42," "Gelvatol 20–90," and "Vinol 540." Both "Elvanol 50–42" and "Gelvatol 20–90" are medium viscosity polyvinyl alcohols, having viscosities of 35 to 45 centipoises in a 4% aqueous solution at 20° C., and a percentage hydrolysis of 86 to 89%. "Vinol 540" is a polyvinyl alcohol having a viscosity of about 40 centipoises in a 4% aqueous solution at 20° C., and a percentage hydrolysis of about 87 to 89%. It will be understood, however, that other grades of polyvinyl alcohol can be used.

Suitable as catalysts are the oil soluble free-radical catalysts such as the organic peroxides, e.g. lauroyl peroxide, tert-butyl peroxy pivalate, 2,4-dichlorobenzoyl peroxide, and benzoyl peroxide, or the azo-nitrile catalysts, such as disclosed in Hunt U.S. Pat. No. 2,471,959, e.g., azo-bis-isobutyronitrile, which is commercially referred to in the arts as "AZN." Also particularly suitable is the use of a water-soluble promotor, such as sodium bisulfite, in combination with the oil-soluble free-radical catalyst.

The quantity of suspending agent can vary widely, but most suitably it is present in the amount of 0.01 to 0.5% by weight based upon the total quantity of monomers in the aqueous system, preferably 0.02 to 0.2% by weight.

Similarly, the quantity of catalyst can vary, but best results are obtained when the catalyst is present in the amount of 0.01 to 2.0% by weight based upon the monomers, preferably 0.05 to 0.5% by weight.

The aqueous suspension polymerization system also may advantageously include a wetting agent in the amount of 0.001 to 1.0% by weight of the monomers, preferably 0.005 to 0.5% by weight. Any of the many wetting agents used in suspension polymerization systems may be employed, but most preferably the wetting agent is sodium di-octyl sulfosuccinate, e.g., the product sold commercially as "Aerosol-OT."

In order to maintain the pH of the suspension system at the desired value, there is suitably added an alkaline buffering agent of any convenient type. Any alkaline material which is compatible with the suspending agent can be used as the buffer. The amount of buffer is that sufficient to adjust the pH of the suspension within the desired range. Ammonium and sodium bicarbonate are preferred buffer because of their compatibility with the system and their low cost. The amount of buffer is generally about 0.1 to 0.5% by weight, based on the monomers. Other buffers such as disodium phosphate, sodium acetate, and the like, can, however, also be used. When superior electrical properties are desired in the product a nonmetallic buffer, such as ammonium bicarbonate, is preferred.

The amount of water used is that which is sufficient to accommodate the various components of the system and to support the resultant terpolymer in suspension in conventional manner. Thus, ordinarily the weight ratio of water to total monomer is from about 1 to 1 up to about 4 to 1.

In carrying out the polymerization operation, a solution of the suspending agent and wetting agent is first prepared. This is effected by dissolving the wetting agent in sufficient water to form a solution, followed by the portionwise addition of the suspending agent, while stirring the solution vigorously. Alternatively, the suspending agent and the wetting agent can be separately dissolved and the resulting solutions combined. Although it is not necessary to do so, the foregoing steps are suitably carried out with the water at a slightly elevated temperature, e.g., 75°–80° C., and after the solution has been formed it is allowed to cool to room temperature. The foregoing solution is then diluted with enough water to form the desired volume to be charged to the polymerization vessel, and the buffering agent is dissolved in the solution.

The solution is then, in the case of batch polymerization, charged to a suitable polymerization vessel, such as an autoclave constructed to withstand pressures up to about 300 pounds per square inch, and the catalyst is added to the solution. The autoclave is sealed and flushed successively with nitrogen and then with vinyl chloride in vapor form. Agitation of the reactor contents is begun, and the vinyl chloride monomer, the ethylene monomer and the propylene monomer are introduced, the vinyl chloride monomer being introduced as a liquid and the propylene and ethylene monomers being introduced in liquid or in gaseous form. The polymerization system is then brought to reaction temperature, e.g., 50° C. with constant agitation, and reaction is continued until the desired polymerization is achieved. The time of reaction will, of course, vary, depending upon the size of the apparatus and the volumes of the reactants employed, but, ordinarily, reaction times of 8 to 16 hours are generally sufficient.

The vinyl chloride can be added entirely at the beginning of the reaction, but it can also be added stepwise or intermittently during the course of the reaction, the rate of addition of the liquid monomer being controlled so that there is always free vinyl chloride monomer present in the reaction vessel. This can be readily determined by sampling or by other conventional means.

The ratios among the propylene monomer, the ethylene monomer, and the vinyl chloride monomer are selected to provide a terpolymer having the above specified contents of 2 to 10% of propylene and ethylene. In general, in carrying out the polymerization method described, the ratios among the monomers charged are such that the ethylene and propylene are each present usually in at least about 100% excess in relation to the ratios of the two monomers in the finished terpolymer, polymerization being continued until most of the vinyl chloride charged has reacted, e.g., 85–95%.

While the invention has been described above in its broader terms, it will be more fully understood by reference to the following specific examples of practical application. In the examples, all parts are by weight, unless otherwise indicated.

Physical characteristics of the vinyl chloride terpolymers, of formable rigid resinous compositions embodying them, which may be referred to below, and which are not identified by previously-mentioned testing methods, are determined by conventional standard tests.

All of the vinyl chloride terpolymers produced in the following examples have the characteristics described above for the resins with which the invention is concerned, including Dynamic Processability Indices of more than 300 when tested in the form of the standard test specimen described.

EXAMPLE 1

A jacketed stainless steel autoclave was employed as the reaction vessel. Agitation was provided by a four-bladed axial flow impeller and combination baffle-thermowell.

Vinyl chloride, ethylene, and propylene monomers of CP grade were employed. The vinyl chloride monomer was distilled before use, whereas the ethylene and propylene, both of low oxygen content type, were used without further purification.

The polymerization mixture was composed of the following components in the proportions indicated:

|  | Quantity, parts by weight | Percent of total monomers |
|---|---|---|
| Water | 272 | 175.5 |
| Vinyl chloride | 132 | 87.9 |
| Ethylene | 7.60 | 4.9 |
| Propylene | 11.11 | 7.2 |
| Tert-butyl peroxy pivalate (Lupersol 11) | 0.467 | 0 4 |
| Methyl cellulose (Methocel 90HG 100 cps.) | 0.069 | 0.045 |
| Sodium di-octylsulfosuccinate (Aerosol-OT-75% aqueous solution) | 0.0087 | 0.0056 |
| Sodium bicarbonate (buffer) | 0.0354 | 0.023 |

A solution of the suspending agent and wetting agent was prepared as follows: 0.0087 part of Aerosol-OT in 75% solution was stirred into 6.6 parts of deionized water and heated to 80° C. with agitation and 0.069 part of the suspending agent (Methocel) was added. The resultant mixture was allowed to cool to room temperature with continuous stirring. The sodium bicarbonate was then added, followed by the addition of 1.1 parts of the deionized water as a rinse to assure a complete transfer of the solution from its preparation vessel to the storage vessel.

The reaction vessel was then charged with 261 parts of deionized water, 0.467 part of catalyst, and the aqueous suspending agent, wetting agent, and 3.3 parts of deionized rinse water. The reactor was filled to about 88% of its volume. The reactor was then sealed and flushed out successively with nitrogen and vinyl chloride vapor, the distilled vinyl chloride was added as a liquid, after which stirring was commenced, followed by the addition of the ethylene and propylene. Then the reactants were brought to a reaction temperature of about 46° C. (115° F.) over a 10-minute period, and allowed to react for 9.3 hours at a pressure of 240 p.s.i.g. The temperature of the reaction mixture was then lowered to about 25° C., and the excess monomers vented off. The product was centrifuged and dried in a vacuum oven at a jacket temperature of 85° C. (60° C. resin temperature) and 27″ Hg vacuum for approximately 6.5 hours. The product obtained in approximately 38% conversion (based on total monomers) contained about 3.5% propylene, 2.0% ethylene, and 94.5% vinyl chloride by weight and had an intrinsic viscosity of about 0.83 dl./g. When formed into a standard molded test specimen it exhibited the following properties:

$T_f$—67.5° C.
$T_4$—74.0° C.
HDT—74.5° C.
Melt flow—11.2 dg./min.
Sp. gr.—1.374
Heat stability—40 min.

Using corresponding procedures, other vinyl chloride-ethylene-propylene terpolymers were prepared by varying the percentages of the monomers, the reaction temperature, the catalyst, the amounts of other components, and the like. Typical operating data for these experiments are shown in Table 1 and Table 2 are listed typical property data for the resultant vinyl chloride-ethylene-propylene terpolymers.

composition and, therefore, melt viscosity will increase considerably, whereas the latter never attains a low melt viscosity even at higher processing temperatures.

When the vinyl chloride-ethylene-propylene terpolymers of this invention are compounded into molding compositions, e.g., with 3 phr. (parts per hundred) of a stabilizer, such as an octyl tin mercaptide (Advastab T–270), and 0.5 phr. of a lubricant, such as mineral oil, and the compounds then molded in a standard molding machine, such as an Ankerwerke screw-injection molding machine (30 oz. capacity), the compounds mold easily without degradation. In contrast, when similar compounds formed from commercial vinyl chloride homopolymer or commercial vinyl chloride-vinyl acetate (87/13) copolymer are molded under the same conditions, decomposition is readily evident by carbon formation, and the molded products have poor characteristics in comparison with the characteristics of the molded products formed from the terpolymers of the invention.

The terpolymers of the invention are also effective in formulations designed for food-packaging applications. Such formulations require the use of nontoxic calcium and zinc organic stabilizers which are much less effective than

TABLE 1

| Example No. | 2 | 3 | 4 | 5 | 6 | 7 | 8 | 9 | 10 |
|---|---|---|---|---|---|---|---|---|---|
| Charge: Percent of Total Monomer: | | | | | | | | | |
| Vinyl chloride | 86.9 | 86.8 | 87.6 | 89.5 | 91.4 | 85.7 | 92.2 | 92.8 | 88.9 |
| Ethylene | 5.8 | 6.1 | 7.7 | 5.8 | 3.8 | 5.8 | 2.8 | 2.3 | 2.3 |
| Propylene | 7.3 | 7.1 | 4.6 | 4.7 | 4.8 | 8.4 | 4.9 | 4.8 | 8.8 |
| Water | 179 | 176 | 175 | 175 | 168 | 175 | 189 | 175 | 176 |
| Catalyst, type [1] | L11 | L11 | L11 | L11 | L11 | L11 | L11 | L11 | L11 |
| Catalyst, percent | 0.4 | 0.4 | 0.4 | 0.4 | 0.38 | 0.4 | 0.375 | 0.4 | 0.4 |
| Sodium bisulfite, percent | | | | | | | 0.122 | | |
| Methocel 90 HG 100 cps | 0.046 | 0.04 | 0.04 | 0.045 | 0.04 | 0.045 | 0.13 | 0.045 | 0.045 |
| Aerosol-OT | 0.0057 | 0.0056 | 0.0056 | 0.0056 | 0.0054 | 0.0056 | 0.0163 | 0.0056 | 0.0056 |
| Sodium bicarbonate | 0.023 | 0.023 | 0.023 | 0.023 | 0.022 | 0.023 | [2] 0.033 | 0.023 | 0.023 |
| Reaction Conditions: | | | | | | | | | |
| Temp., °F | 120 | 125 | 115 | 120 | 125 | 120 | 115 | 120 | 120 |
| Time, hrs | 10 | 10.25 | 8.5 | 10.8 | 9.5 | 10.2 | 11.5 | 10.5 | 10.5 |
| Max. press., p.s.i.g | 255 | 258 | 315 | 259 | 250 | 255 | 210 | 175 | 175 |
| Yield, percent total monomer | 51 | 63 | 37 | 64 | 72 | 46 | 62 | 70 | 55 |

[1] L11—Lupersol 11 (tert. butyl peroxypivalate).
[2] Calcium chloride, anhydrous.

TABLE 2

| Example No. | 2 | 3 | 4 | 5 | 6 | 7 | 8 | 9 | 10 |
|---|---|---|---|---|---|---|---|---|---|
| Wgt. percent propylene | 3.9 | 5.1 | 2.8 | 3.0 | 3.9 | 4.7 | 4.0 | 3.3 | 4.9 |
| Wgt. percent ethylene | 2.5 | 1.8 | 3.0 | 2.2 | 1.3 | 2.1 | 0.5 | 0.9 | 0.6 |
| Sp. gr. at 25° C | 1.369 | 1.366 | 1.372 | 1.375 | 1.376 | 1.366 | 1.380 | 1.382 | 1.374 |
| Intrinsic visc., dl./g | 0.73 | 0.67 | 0.87 | 0.82 | 0.73 | 0.72 | 0.88 | 0.78 | 0.76 |
| Melt flow rate, dg./min | 22.8 | 51.4 | 7.0 | 10.1 | 14.7 | 36.1 | 2.1 | 3.0 | 20.2 |
| $T_f$, °C | 65.7 | 66.2 | 65.4 | 67.3 | 69.5 | 65.5 | 71.8 | 71.7 | 70.2 |
| HDT, °C | 74.5 | 72.5 | 73 | 73 | 73 | 71.5 | 78 | 76 | 76 |
| Tens. yield stress, p.s.i | 7,600 | 7,350 | 7,550 | 7,250 | 7,650 | 7,300 | 7,950 | 7,450 | 7,650 |
| Ult. tens. str., p.s.i | 4,550 | 4,350 | 4,900 | 4,600 | 4,850 | 4,350 | 6,300 | 5,000 | 4,550 |
| Ult. elong., percent | 50 | 20 | 20 | 50 | 30 | 40 | 140 | 70 | 30 |
| Heat stability, min. at 400° F | 45 | 40 | 35 | 45 | 45 | 40 | 45 | 45 | 45 |

It will thus be seen that vinyl chloride-ethylene-propylene terpolymers, having the combination of characteristics discussed above, can be prepared by several methods, and appropriate variations in these methods, to bring about the desired variations in the resin characteristics, within the framework of the specific combination of relationships specified, will be readily apparent to those skilled in the art.

As previously indicated, the vinyl chloride-ethylene-propylene terpolymers of this invention can be formed into formable compositions for molding, extrusion and like operations, which have exceptional dynamic processability which makes them suitable for uses heretofore foreclosed to polyvinyl chloride homopolymers, yet having desirable product characteristics.

Optimum dynamic processability is a combination of high melt flow and high thermal stability, resulting in extremely low melt viscosities at the maximum temperatures permitted by the inherent stability of the resin under high shear conditions. Resinous compositions having high melt flow with poor thermal stability or resinous compositions having low melt flow with high thermal stability do not have good dynamic processability. The former must be handled at relatively low temperatures to avoid destabilizers, such as tin, lead, cadmium, and barium organic compounds, which are unacceptable in connection with food applications.

Containers, such as one quart containers, can be readily extrusion blow molded from compounds containing the terpolymers of this invention, in combination with a typical nontoxic stabilizer and suitable lubricant, whereas vinyl chloride homopolymer and vinyl chloride-vinyl acetate copolymers degrade and show immediate and serious discoloration when an attempt is made to extrusion blow mold compounds containing them.

The vinyl chloride-ethylene-propylene terpolymer compositions of this invention are also effective for extrusion operations, such as the extrusion of film, and can be formed into a film by extrusion casting on to a polished roll, e.g., at temperatures up to 385° F.

Stabilizers, which can be used in compositions comprising the vinyl chloride-ethylene-propylene terpolymers of this invention, are standard commercial compounds well-known to the vinyl polymer art. Typical stabilizers, which are generally known in the art by tradenames, are Thermolite 31, a liquid organic tin stabilizer, Mark 292, an alkyl tin thioglycollate, Advastab T–270 and Advastab T–360, which are solid organic tin mercaptides of the type disclosed in U.S. Pat. No. 3,027,350, the former being an octyl compound, Mark QED, which is composed of calcium, magnesium, and zinc fatty acid soaps, Mark 35 which is a zinc fatty acid soap, Advawax 140, which is a solid fatty ester wax and Advawax 280, which is a N,N'-ethylene bis-stearamide wax.

As previously indicated, the particular advantage of the composition of this invention is that they can be used in conventional molding, extrusion, or other hot shaping apparatus, under the conditions at which such apparatus is built to operate, to produce quality rigid products efficiently and effectively. For example, blow molding, or other pressure-differential molding operations, such as thermoforming, for which the rigid resinous compositions of the invention are particularly suited, can be carried out in known equipment, using known techniques. A typical blow-molding system is described, for example, in Gasmire U.S. Pat. No. 3,065,501. In like manner, injection molding and other plastic shaping operations can be carried out in standard equipment and by standard processes. A description of various types of apparatus for the hot shaping of fluxed resinous compositions, which can be termed "thermomolding," and with which the compositions of this invention can be used, is conveniently found in "The Encyclopedia of Plastics Equipment," edited by Herbert R. Simonds and published by Reinhold Publishing Corp., New York (1964). In other words, the compositions of this invention can easily be processed effectively at temperatures of 250 to 450° F. Yet, they will produce rigid shaped products which are not marred by discoloration due to degradation of the polymer and have desirably elevated heat-deflection characteristics.

It will be apparent to those skilled in the art that various changes and modifications may be made in the embodiments described above without departing from the invention, as defined in the appended claims. It is intended, therefore, that all matter contained in the foregoing description and in the drawing shall be interpreted as illustrative only and not as limitative of the invention.

I claim:
1. A vinyl chloride-ethylene-propylene terpolymer having a combined ethylene-propylene content of at least about 2% by weight up to about 10% and the ratio between ethylene and propylene varying from 5:1 to 1:20, but said ethylene content being at least about 0.5%.
2. A terpolymer as defined in claim 1 having a combined ethylene-propylene content of 3 to 8% by weight and an ethylene to propylene ratio varying from 5:1 to 1:10.
3. A terpolymer as defined in claim 1 having an average molecular weight, expressed in terms of intrinsic viscosity, of 0.5 to about 1.5 dl./g. and the ratio between ethylene and propylene varying from 2:1 to 1:10.
4. A terpolymer as defined in claim 1 having melt flow rate of at least 0.1 dg./min.
5. A terpolymer as defined in claim 3 having a combined ethylene-propylene content of up to 10% by weight.
6. A terpolymer as defined in claim 3 having a melt flow rate of at least 0.1 dg./min.
7. A rigid resinous composition formable by thermomolding operations into a shaped article which comprises a terpolymer of vinyl chloride, ethylene and propylene, as defined in claim 1, and from about 0.1 to 10% by weight of a stabilizer and a lubricant.
8. A rigid resinous composition formable by thermomolding operations into a shaped article as defined in claim 7, wherein said terpolymer is characterized by a combined ethylene-propylene content of 3 to 8% by weight.
9. A rigid resinous composition formable by thermomolding operations into a shaped article as defined in claim 7, wherein said terpolymer is characterized by an average molecular weight, expressed in terms of intrinsic viscosity, of 0.5 to about 1.5 dl./g.
10. A rigid resinous composition formable by thermomolding operations into a shaped article as defined in claim 7, wherein said terpolymer is characterized by a melt flow rate of at least 0.1 dg./min.
11. A rigid resinous composition formable by thermomolding operations into a shaped article as defined in claim 7, wherein said terpolymer is characterized by an average molecular weight, expressed in terms of intrinsic viscosity, of 0.5 to about 1.5 dl./g., and a melt flow rate of at least 0.1 dg./min.
12. A rigid thermo-molded shaped article formed from a composition as defined in claim 7, wherein said terpolymer has an average molecular weight, expressed in terms of intrinsic viscosity, of 0.5 to about 1.5 dl./g., with a melt flow rate of at least 0.1 dg./min., and an apparent modulus of elasticity of at least 100,000 p.s.i. at a temperature within the range from about 40° C. to about 80° C.
13. A rigid thermo-molded shaped article as defined in claim 12, wherein said stabilizer is a nontoxic stabilizer.
14. A terpolymer as defined in claim 1, wherein said terpolymer is characterized by a dynamic processability index of at least 300.
15. A rigid resinous compositions as defined in claim 7, wherein said terpolymer is characterized by a dynamic processability index of at least 300.
16. A terpolymer as defined in claim 6, wherein said terpolymer is characterized by a dynamic processability index of at least 300.
17. A rigid resinous composition as defined in claim 11, wherein said terpolymer is characterized by a dynamic processability index of at least 300.

References Cited

UNITED STATES PATENTS

| 2,422,392 | 6/1947 | Brubaker et al. | 260—87.5 |
| 2,875,187 | 2/1959 | Gerhard | 260—92.8 |
| 3,403,137 | 9/1968 | Andersen et al. | 260—87.5 |
| 3,468,858 | 9/1969 | Heiberger et al. | 260—87.5 |

FOREIGN PATENTS

| 1,032,738 | 6/1966 | Great Britain. |

JOSEPH L. SCHOFER, Primary Examiner

S. M. LEVIN, Assistant Examiner

U.S. Cl. X.R.

260—23, 29.1, 30.6, 31.2, 31.8, 33.6, 41, 45.7, 45.75, 78.5, 86.3, 87.1, 87.5, 92.8, 887, 891, 899, 901

UNITED STATES PATENT OFFICE
CERTIFICATE OF CORRECTION

Patent No. 3,541,061        Dated November 17, 1970

Inventor(s) Charles A. Heiberger

It is certified that error appears in the above-identified patent and that said Letters Patent are hereby corrected as shown below:

Col. 3, line 58, "D243-60" should read -- D1243-60 --.

Col. 5, line 5, "structure" should read -- structures --.

Col. 8, line 1, "it" should read -- is --;

line 33, "polymers" should read -- terpolymers --.

Col. 10, in the tabulation under "Percent of Total Monomers column, line 5, "0 4" should read -- 0.4 --.

Signed and sealed this 15th day of June 1971.

(SEAL)
Attest:

EDWARD M. FLETCHER, JR.
Attesting Officer

WILLIAM E. SCHUYLER, JR
Commissioner of Patents